(12) United States Patent
Pfund et al.

(10) Patent No.: US 8,152,119 B2
(45) Date of Patent: Apr. 10, 2012

(54) LUMINAIRE BRACKET ASSEMBLY

(75) Inventors: David Pfund, Woodbridge, CT (US);
James A. Melling, New Haven, CT (US)

(73) Assignee: Sylvan R. Shemitz Designs, Inc., West Haven, CT (US)

( * ) Notice: Subject to any disclaimer, the term of this patent is extended or adjusted under 35 U.S.C. 154(b) by 114 days.

(21) Appl. No.: 11/593,369

(22) Filed: Nov. 6, 2006

(65) Prior Publication Data
US 2007/0109798 A1    May 17, 2007

Related U.S. Application Data

(60) Provisional application No. 60/733,628, filed on Nov. 4, 2005.

(51) Int. Cl.
*A47B 96/06* (2006.01)
*A47G 29/00* (2006.01)
*A47K 1/00* (2006.01)
*E04G 3/00* (2006.01)
*E04G 5/06* (2006.01)
*F21V 21/00* (2006.01)
*F21V 35/00* (2006.01)

(52) U.S. Cl. ......... 248/220.43; 248/220.21; 248/220.22; 248/220.31; 248/220.41; 248/225.21; 33/375

(58) Field of Classification Search ............. 248/220.21, 248/220.22, 220.31, 220.41, 220.43, 225.21; 33/375
See application file for complete search history.

(56) References Cited

U.S. PATENT DOCUMENTS

| 2,741,449 | A |   | 4/1956  | Heselov |
|-----------|---|---|---------|---------|
| 3,114,531 | A |   | 12/1963 | Weber |
| 3,243,152 | A |   | 3/1966  | Harling |
| 3,779,499 | A | * | 12/1973 | Shell ............................. 248/245 |
| 3,891,172 | A | * | 6/1975  | Einhorn .................... 248/220.43 |
| 4,387,872 | A | * | 6/1983  | Hogue ...................... 248/221.11 |
| 4,441,619 | A | * | 4/1984  | Gibitz .......................... 211/70.6 |
| 4,854,535 | A | * | 8/1989  | Winter et al. ............. 248/220.22 |
| 4,874,148 | A | * | 10/1989 | Guinter .................... 248/220.22 |
| 4,881,156 | A | * | 11/1989 | Shemitz et al. ............... 362/220 |
| 5,185,971 | A | * | 2/1993  | Johnson, Jr. .................. 52/36.6 |
| 5,356,106 | A | * | 10/1994 | Trotta et al. .................. 248/243 |
| 5,855,347 | A | * | 1/1999  | Hollingsworth et al. 248/220.41 |
| 6,186,455 | B1 | * | 2/2001 | Hollingsworth et al. 248/220.31 |
| 6,266,250 | B1 | * | 7/2001 | Foye ............................. 361/760 |
| 6,711,871 | B2 | * | 3/2004 | Beirise et al. ................ 52/782.1 |
| 6,793,185 | B2 | * | 9/2004 | Joliey ....................... 248/220.21 |
| 7,111,813 | B2 | * | 9/2006 | Lin ............................... 248/239 |
| 7,338,021 | B2 | * | 3/2008 | Barkdoll et al. ......... 248/220.31 |
| 7,441,736 | B2 | * | 10/2008 | Wiltfang .................. 248/220.42 |
| 2003/0019984 | A1 | * | 1/2003 | Yee et al. ................. 248/220.31 |
| 2004/0031890 | A1 | * | 2/2004 | Haluzak ................... 248/220.31 |

(Continued)

OTHER PUBLICATIONS

PCT Search Report—PCT/US06/43216.

*Primary Examiner* — Nkeisha Smith
(74) *Attorney, Agent, or Firm* — Cantor Colburn LLP

(57) ABSTRACT

A bracket assembly comprising at least one mounting base including at least one surface association means, at least one engaging extension extending from the at least one mounting base, the at least one engaging extension rotatingly associating at least one luminaire with the mounting base, and at least one luminaire leveling device adjustably extending from the at least one mounting base, a contact portion of the leveling device removably contacting the at least one luminaire.

14 Claims, 10 Drawing Sheets

U.S. PATENT DOCUMENTS

| | | | |
|---|---|---|---|
| 2004/0094679 A1* | 5/2004 | Rose et al. | 248/220.21 |
| 2005/0161564 A1* | 7/2005 | Ganske | 248/220.21 |
| 2005/0204966 A1* | 9/2005 | Bienick et al. | 108/108 |
| 2006/0022100 A1* | 2/2006 | Lan | 248/220.21 |
| 2007/0145213 A1* | 6/2007 | Fischer | 248/205.1 |
| 2008/0017777 A1* | 1/2008 | Jones | 248/479 |
| 2008/0036342 A1* | 2/2008 | Heyer | 312/257.1 |
| 2008/0116330 A1* | 5/2008 | Cotto | 248/188.4 |

\* cited by examiner

LUMINAIRE BRACKET ASSEMBLY

CROSS-REFERENCE TO RELATED APPLICATIONS

This application claims the benefit of U.S. Provisional Application 60/733,628 filed on 4 Nov. 2005, the contents of which are incorporated by reference herein in their entirety.

FIELD OF THE INVENTION

The disclosure relates generally to a bracket assembly, and more particularly to a bracket assembly for a luminaire.

BACKGROUND OF THE INVENTION

Mounting brackets designed to facilitate the installation of luminaires and other office furniture components to vertical walls and modular office panels are well known. However, it is also known that tolerances in the fabrication of luminaires, mounting brackets, modular file cabinets, and modular office panel systems can result in panel-mounted and cabinet-mounted luminaire installations that are out of level in profile. This out of level profiling may also occur in the case of wall mounted luminaires due to surface variations where the luminaire mounting brackets are installed. Often the result occurs with the forward or unsupported edge of the luminaire positioned below that of the rear edge (though the opposite can also occur). This resulting "sag" disadvantageously reduces the shielding angle of the ambient lighting and may disadvantageously affect the distribution of light on tasks below the luminaire, where task or task/ambient luminaires are used. Thus, a convenient means for leveling a luminaire attached to a surface via a bracket system would be desirable.

BRIEF DESCRIPTION OF THE INVENTION

Disclosed is a bracket assembly comprising at least one mounting base including at least one surface association means, at least one engaging extension extending from the at least one mounting base, the at least one engaging extension rotatingly associating at least one luminaire with the mounting base, and at least one luminaire leveling device adjustably extending from the at least one mounting base, a contact portion of the leveling device removably contacting the at least one luminaire.

Also disclosed is a bracket assembly comprising at least one mounting base associated with at least one substantially portable stanchion, at least one engaging extension extending from the at least one mounting base, the at least one engaging extension rotatingly associating at least one luminaire with the mounting base, and at least one luminaire leveling device adjustably extending from the at least one mounting base, a contact portion of the leveling device removably contacting the at least one luminaire.

Further disclosed is a bracket assembly comprising at least one mounting base including at least one means for associating the mounting base to modular panel furniture, at least one engaging extension extending from the at least one mounting base, the at least one engaging extension rotatingly associating at least one luminaire with the mounting base, and at least one luminaire leveling device adjustably extending from the at least one mounting base, a contact portion of the leveling device removably contacting the at least one luminaire.

BRIEF DESCRIPTION OF THE FIGURES

The following descriptions should not be considered limiting in any way. With reference to the accompanying drawings, like elements are numbered alike.

DETAILED DESCRIPTION

Figure 1:
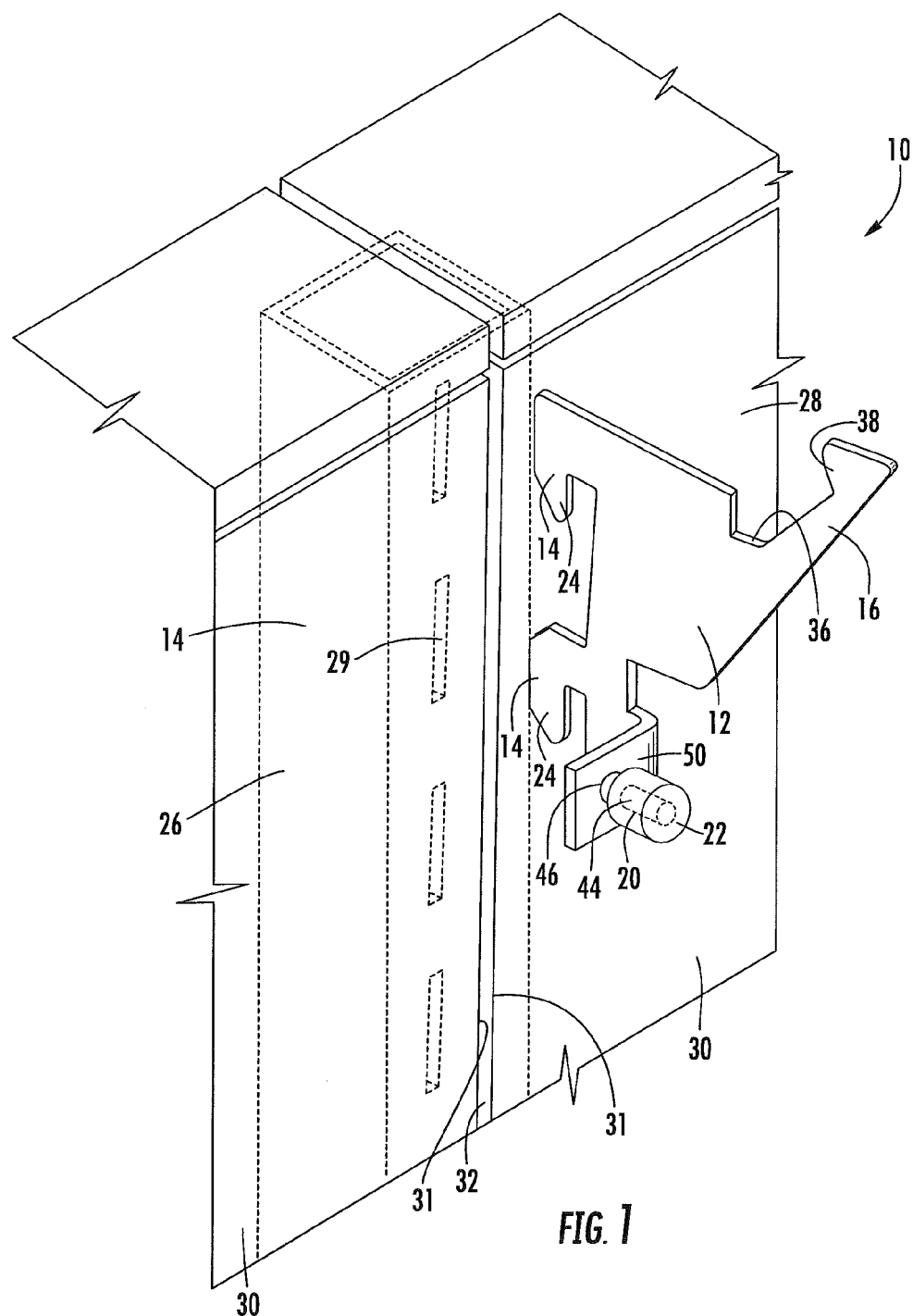
FIG. 1 is a partial perspective view of a bracket assembly in an exemplary embodiment.
Figure 2:
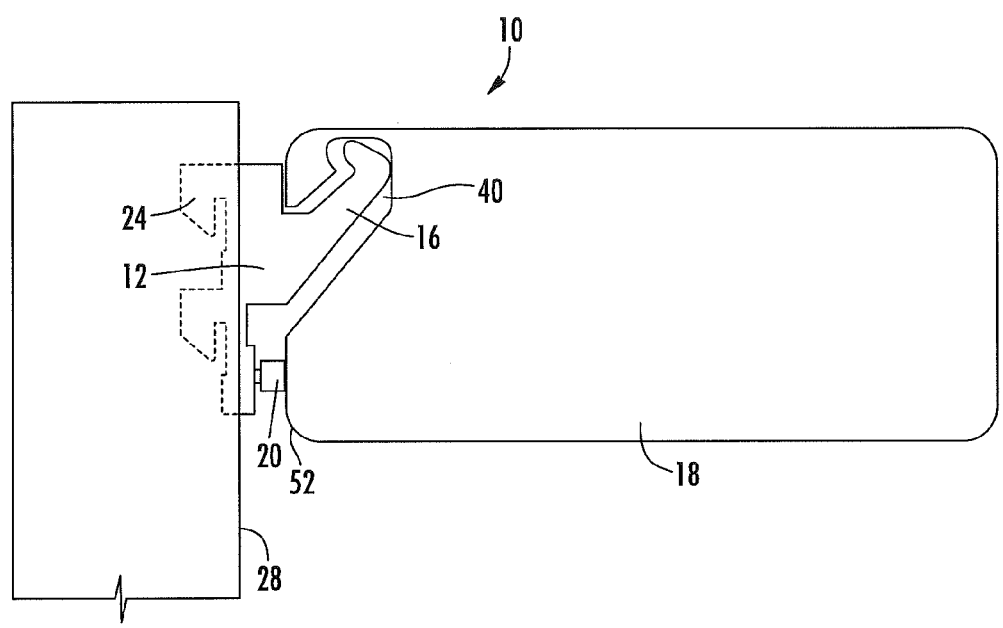
FIG. 2 is a partial side view, of the embodiment of FIG. 1.

Referring to FIGS. 1-8, an exemplary embodiment of a bracket assembly 10 is illustrated. The bracket assembly 10 includes at least one mounting base 12, a surface association means 14, at least one engaging extension 16 extending from the mounting base 12, at least one luminaire 18 rotatingly and removeably associated with the at least one engaging extension 16, and at least one luminaire leveling device 20 adjustably extending from the at least one mounting base 12. The leveling device 20 further includes a contact portion 22 that removably contacts the luminaire 18. With reference to FIGS. 1-8, this embodiment and its variations will be discussed hereinbelow.

Referring to the exemplary embodiment as illustrated in FIGS. 1-4, the surface association means 14 of the bracket assembly 10 is shown to include at least one downwardly facing mounting extension 24 extending from the mounting base 12, and at least one slotted support standard 26 fixed to a desired surface 28. The support standard 26 defines a plurality of support slots 29 that are configured to engage the mounting extensions 34 in a manner that fixes the mounting base 12 to the support standard 26, and thus to the desired surface 28.

In the embodiment of the Figures, the desired surface 28 is a modular panel system (also designated hereinafter with reference numeral 28), such as workstation or cubicle including panels 30. The panels 30 of the panel system 28 include vertical edges 31, and define an elongated vertical opening 32 along these edges 31. The slotted support standard 26 may be incorporated into the panel system 28 (as is best shown in FIG. 1) such that support slots 29 defined by the slotted support standard 26 can be accessible through this vertical opening 32. Access to the slots 29 through the vertical opening 32 allows the mounting extensions 24 to engage and be supported by the slots 29, thus allowing the mounting base 12 to be fixed to the support standard 26 and panel system 28.

It should be appreciated that the slotted support standard 26 may be fixed via any desired means (such as threaded association) to any desired surface including but not limited the panel system discussed above. It should also be appreciated that the desired surface 28 may be disposed at any desired inclination, such as but not limited to the substantially vertical inclination of the surface shown in FIGS. 1-4. This allows the bracket assembly 10 to be fixed to any desired slot support including surface, at any inclination. With a fixed association of the mounting device 12 to the desired surface 28 having been discussed above, the manner by which the luminaire 18 is associated with the mounting device 12 will be discussed hereinbelow.

Referring again to the exemplary embodiment as illustrated in FIGS. 1-4, the engaging extension 16 of the bracket assembly 10 is shown to extend relatively upwardly from the mounting base 12, and in a direction of the luminaire 18. As shown in the Figures, the engaging extension 16 may define a hooked groove 36 and a hooking flange 38. The hooked groove 36 and hooking flange 38 are configured to correspond to dimensions of a relatively horizontal luminaire cavity 40 defined by the luminaire 18, or horizontal flange extending from the luminaire 18. Via disposal of the engaging extension 16 within the luminaire cavity 40 (or with the flange), the luminaire 18 is rotatingly associated/hooked to the engaging extension 16 (and by extension to the mounting base 12). The configurations of the luminaire cavity 40 and engaging extension 16 (i.e. the hooked groove 36 and hooking flange 38) allow the luminaire 18 to rotate to, between, and beyond angle $\theta_1$ and angle $\theta_2$. The leveling device 20 that actuates rotation of the luminaire 18 is discussed hereinbelow.

With continued reference to the exemplary embodiment of FIGS. 1-4, the leveling device 20 of the bracket assembly 10 includes a threaded instrument 44 adjustably disposed in a threaded cavity 46 defined by device flange 48. Device flange 48 extends and is displaced from the mounting base 12. The threaded instrument 44 includes a contact portion 50 (which may itself include a threaded cavity for adjustable disposition along the instrument 44) that is removeably engageable with a relative back surface 52 of the luminaire 18. This contact portion 50 may be of any desirable composition, such as but not limited to a metallic composition (e.g. chrome plated brass), or a more shock absorptive composition, (e.g. rubber or plastic)

Figure 3:
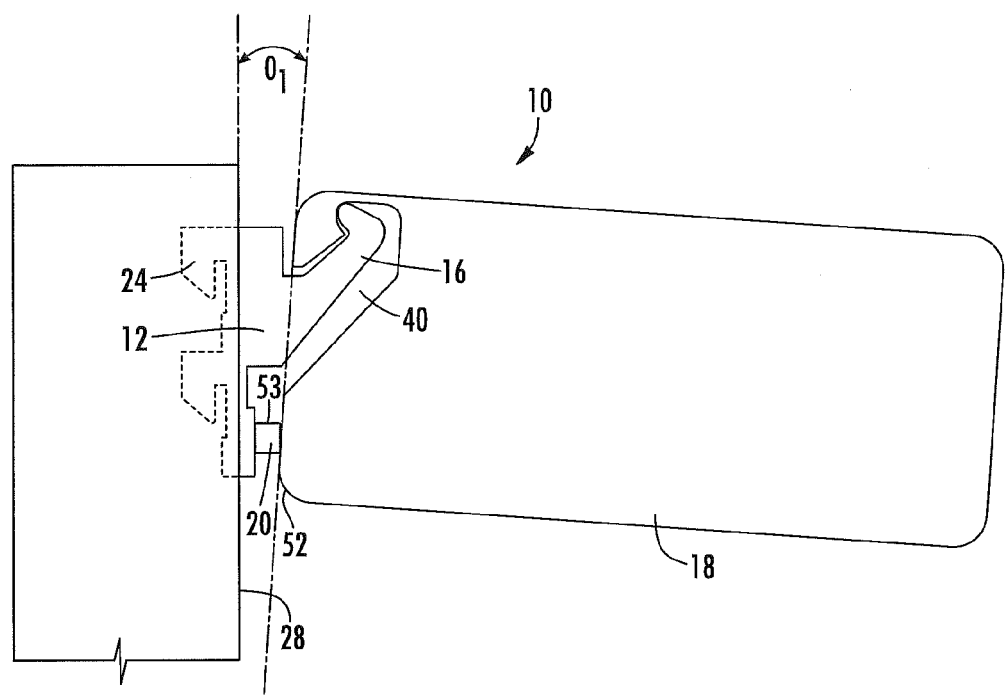
FIG. 3 is the side view of FIG. 2, illustrating relative downward rotation of a luminaire.
Figure 4:
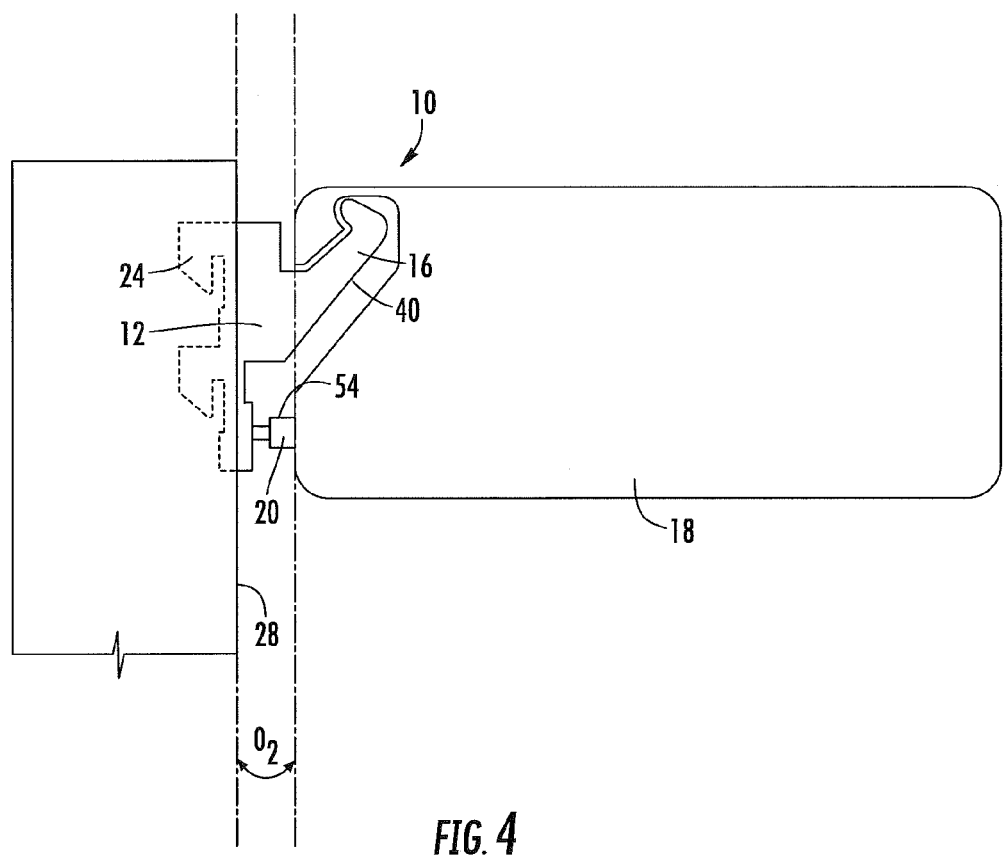
FIG. 4 is the side view of FIG. 2, illustrating relative upward rotation of a luminaire.
Figure 5:
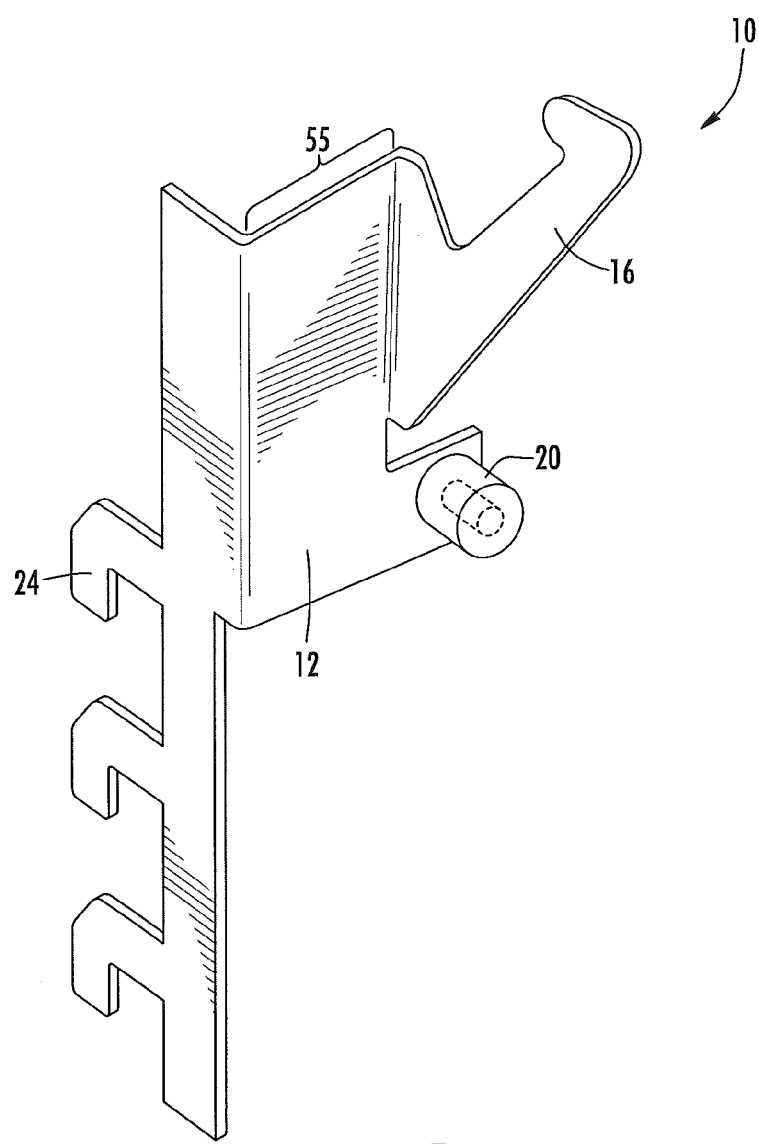
FIG. 5 is a partial perspective view of the bracket assembly in another exemplary embodiment.

Referring specifically to FIG. 3, when the threaded instrument is tightened (for example, by turning the contact portion 50 clockwise) the device 20 is moved into a contracted position 53. Disposal of the device 20 in the contracted position 53 causes the luminaire 18 to rotate relatively downward about its association with the engaging extension 16, and cast light accordingly. This downward rotation may produce the luminaire angle of inclination $\theta_1$, as shown in FIG. 3. Referring to FIG. 4, when the threaded instrument is loosened (by turning the contact portion 50 counter-clockwise) the device 20 is moved into an extended position 54. Disposal of the device 20 in the extended position 54 causes the luminaire 18 to rotate relatively upward about its association with the engaging extension 16, and cast light accordingly. This upward rotation may produce the luminaire angle of inclination $\theta_2$, as shown in FIG. 4. With this rotation of the luminaire 18 via actuation of the leveling device 20 and rotation about the engaging extension 16, the luminaire 18 can be adjusted/leveled with respect to the desired surface 28 to which it is mounted.

Figure 6:
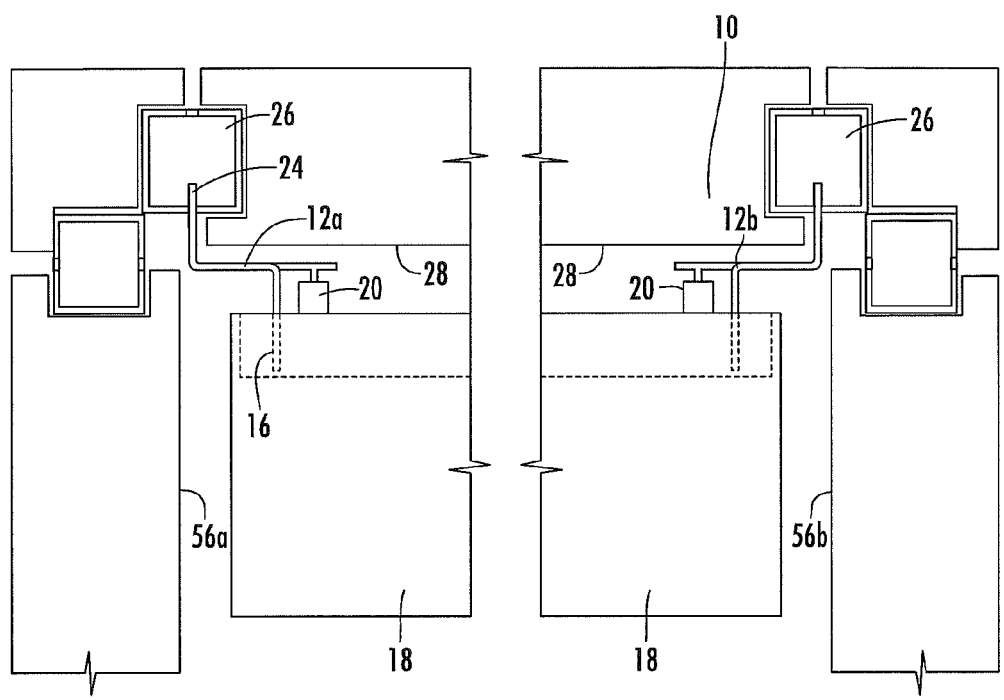
FIG. 6 is a partial top view of the bracket assembly of FIG. 5 in a mounted state.

Referring to FIGS. 5-8, a bracket assembly 100 illustrated shares many of the same features as the assembly 10 of FIGS. 1-4. Those features that are different will be discussed herein. As shown specifically in FIG. 5-6, the engaging extension 16 is horizontally displaced from the mounting extension 24 (the extensions 16 and 24 are aligned in FIG. 1-4). This displacement may be to the right or left (see left mounting bracket 12*a* and right mounting bracket 12*b* in FIG. 6). The displacement may be any desired distance 55 (for example, 1-2 inches), and allows the two mounting bases 12*a-b* to extend away from obstructive structures disposed substantially perpendicularly to the desired mounting surface 28 (see perpendicular structures 56*a-b*). In this manner, the two mounting devices 12*a-b* can support opposite ends of a luminaire 18 disposed between obstructive perpendicular structures 56*a-b*, as shown in FIG. 6.

Figure 7:
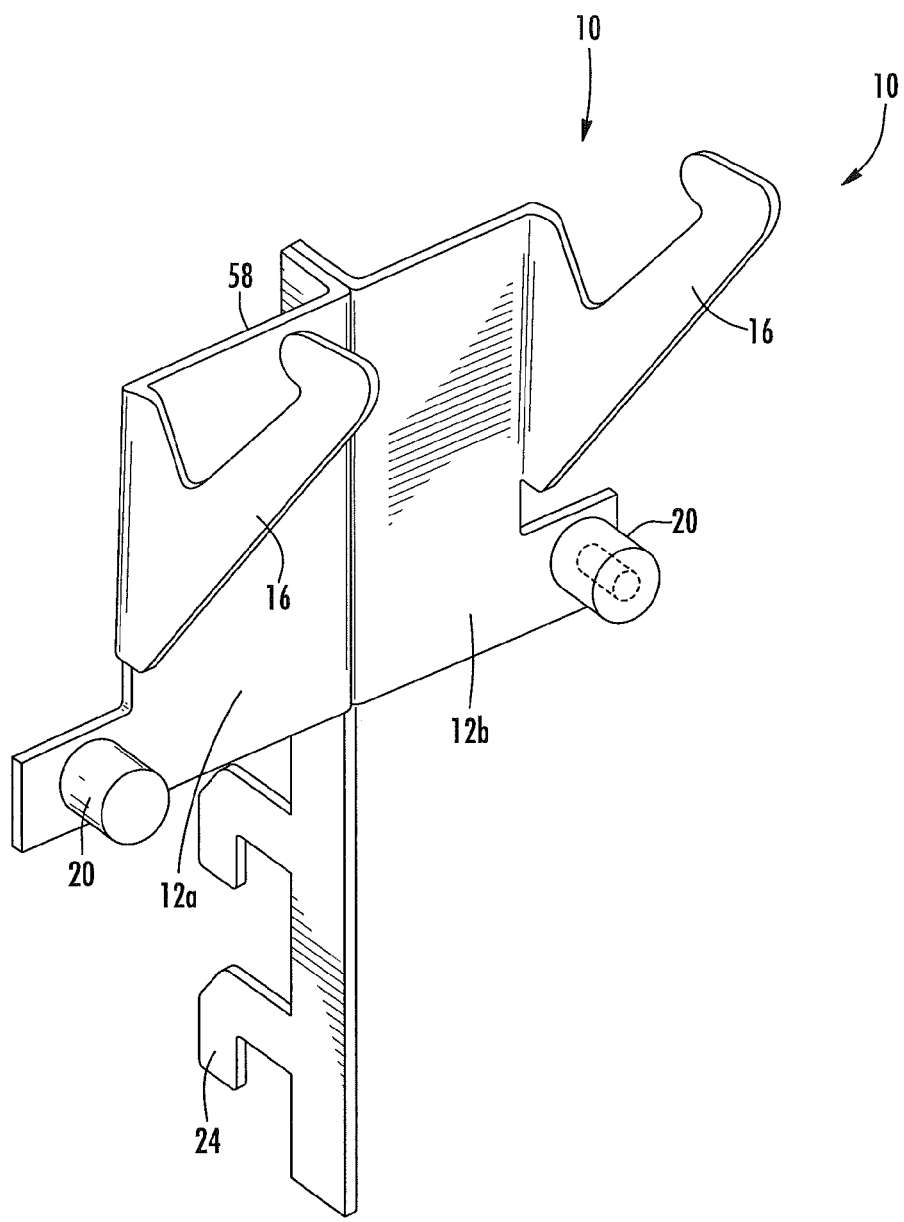
FIG. 7 is a partial perspective view of the bracket assembly in another exemplary embodiment.
Figure 8:
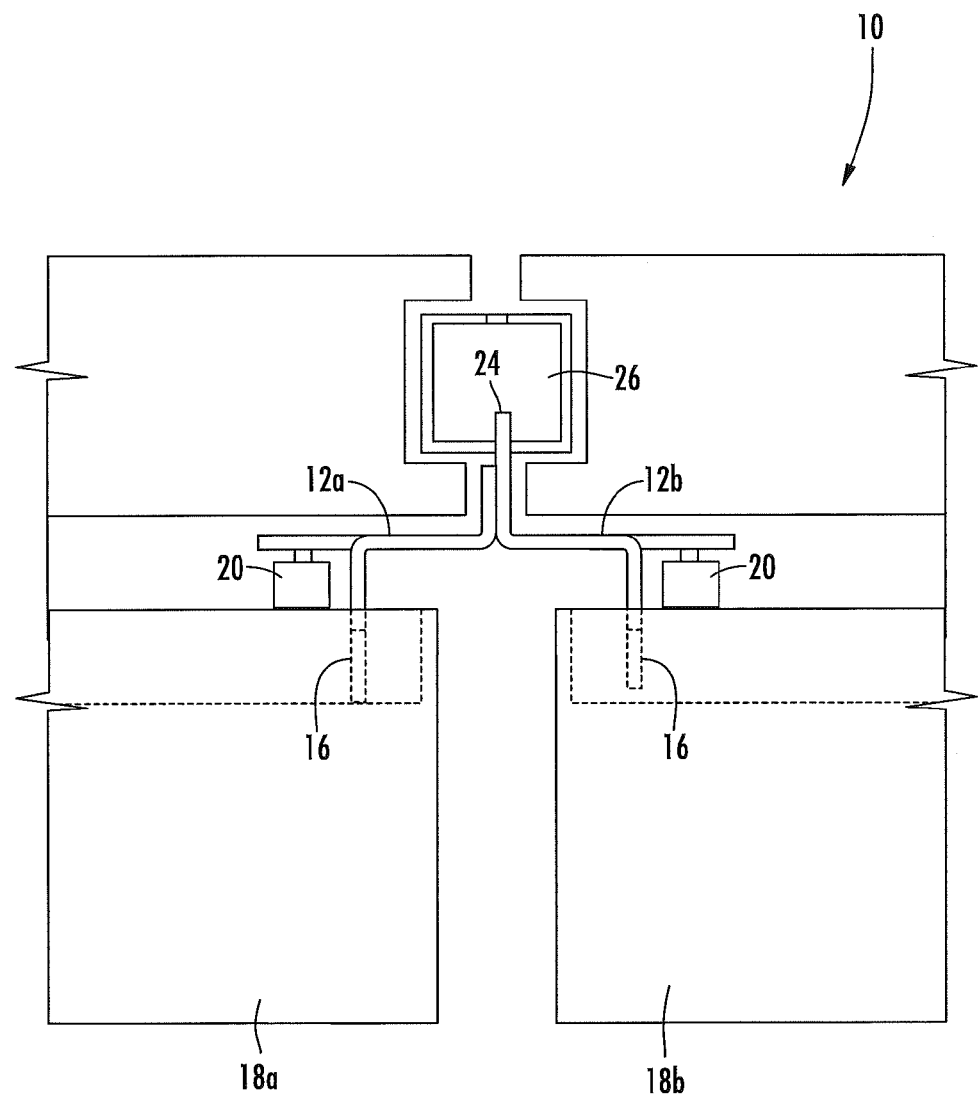
FIG. 8 is a partial top view of the bracket assembly of FIG. 6 in a mounted state.

Referring specifically to FIG. 7, mounting bases 12*a-b* may also be disposed adjacently to each other to create a stabilizing mount for certain luminaire mounting applications. As shown in FIGS. 7-8, the left and right displacement of the engaging extensions 24 in mounting bases 12*a* and 12*b* respectively creates a distance 58 (for example, 2-4 inches) between the extensions 24 that may provide stability to a mounting of a single luminaire. In addition, the distance 58 created by the adjacent but displaced extensions 24 allows the mounting bases 12*a-b* to engage two separate luminaires 18*a-b* at one end of each, as shown in FIG. 8.

Figure 9:
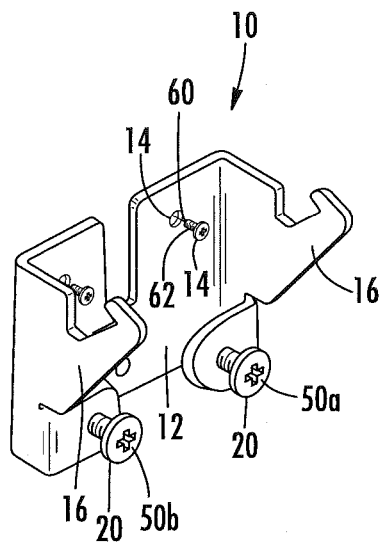
FIG. 9 is a partial perspective view of the bracket assembly in another exemplary embodiment.

Referring now to FIG. 9, another exemplary embodiment of a bracket assembly 200 is illustrated. As the embodiment of FIG. 9 shares many of the same features as the embodiment of FIGS. 1-8, like features will retain like reference characters from FIGS. 1-8. Those features that are different will be discussed herein, starting with the surface associating means 14.

As shown in FIG. 9, instead of including mounting extensions that engage with slotted support standards, the surface associating means 14 of this embodiment comprises threaded mounting cavities 60 defined by the mounting base 12, and threaded mounting instruments 62 associable with the mounting cavities 60. The mounting base 12 is fixed to the desired surface 28 via this threaded means, rendering the slotted support unnecessary. As such, the mounting base 12, and by extension the entire assembly 10, is mountable to a variety of surfaces. It should be appreciated that FIG. 9 also may include a leveling device 20 with a screw head contact portion 50*a* (as might the embodiments of FIGS. 1-8), rather than the shock absorptive stop discussed above.

Figure 10:
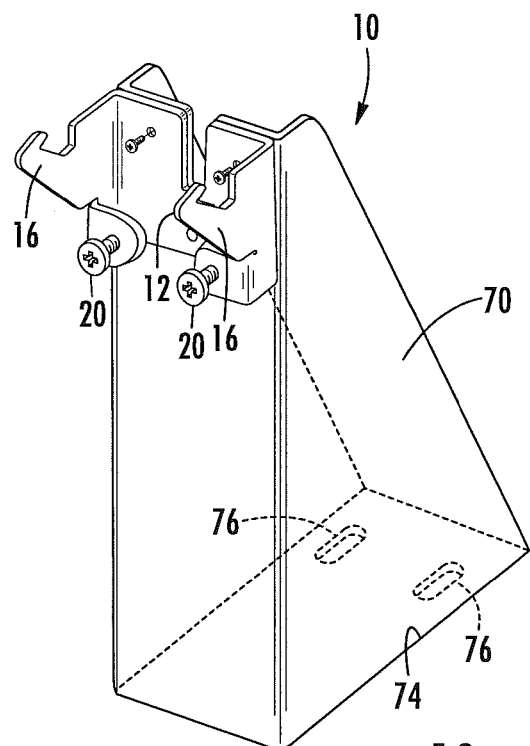
FIG. 10 is a partial perspective view of the bracket assembly in another exemplary embodiment.
Figure 11:
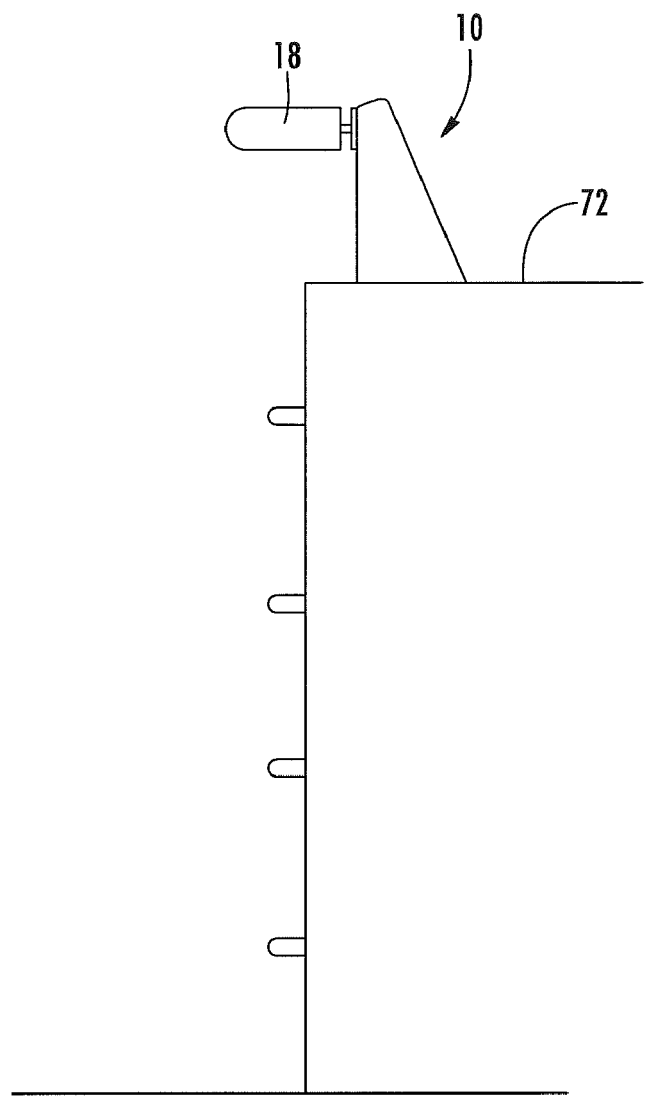
FIG. 11 is a side elevation view of the bracket assembly of FIG. 10 shown mounted to a file cabinet.

Referring now to FIGS. 10-11, another exemplary embodiment of the bracket assembly 10 is illustrated. As the embodiment of FIGS. 10-11 share many of the same features as the embodiments of FIGS. 1-8 and 9, like features will retain like reference characters from FIGS. 1-8 and 9.

In the exemplary embodiment of FIGS. 10-11, the mounting base 12 is fixedly associated, via any means desired, with a substantially portable stanchion 70. The stanchion 70 allows the assembly 10 to be supported at any desired, substantially horizontal surface 72, such as but not limited to a top of a file cabinet, as shown in FIG. 11. The stanchion 70 may include a bottom potion 74 that is weighted to counterbalance the weight of the luminaire 18, or as shown in FIG. 10, the bottom portion 74 may define at least one stanchion cavity 76 for fixing (via threaded association) the stanchion 74 to any desired surface. In a manner similar to that which is shown in FIGS. 1-8, the stanchion 70 may also include mounting extensions for associating said at least the stanchion 70 with a slotted support fixed to a desired surface.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A bracket assembly comprising:
   at least one mounting base including at least one surface association means;
   at least one engaging extension extending from said at least one mounting base, said at least one engaging extension being configured to rotatably associate at least one luminaire with said mounting base and suspend the at least one luminaire from the mounting base at multiple angles from a fixed position in absence of any fastener extending through a surface of said luminaire and a surface of said mounting base; and
   at least one luminaire leveling device adjustably extending from said at least one mounting base, a contact portion of said leveling device being configured to removably contact said at least one luminaire, and being configured to rotate said luminaire about said at least one engaging extension.

2. The assembly of claim 1, wherein said at least one leveling device is adjustably extendable between a contracted position and an extended position in relation to said at least one mounting device, said contact portion of the leveling device removeably contacting a relative back surface of the at least one luminaire.

3. The assembly of claim 2, wherein adjustment of said at least one leveling device toward and into said extended position rotates the at least one luminaire relatively upward about said at least one engaging extension, and wherein adjustment of said leveling device toward and into said contracted position rotates the at least one luminaire relatively downward about said at least one engaging extension.

4. The assembly of claim 3, wherein said at least one leveling device comprises at least one threaded instrument adjustably disposed in at least one threaded cavity defined by at least one flange extending and displaced from said at least one mounting base, said at least one threaded instrument including a shock absorptive material at said contact portion.

5. The assembly of claim 1, wherein said surface association means is a threaded mounting instrument and a threaded mounting cavity, said threaded mounting instrument fixedly associating said mounting base with a desired mounting surface via disposal through said threaded mounting cavity into said desired mounting surface.

6. The assembly of claim 1, wherein said surface association means is at least one mounting extension, said at least one mounting extension extending from said at least one mounting base in a direction substantially opposite of said at least one engaging extension.

7. The assembly of claim 6, further including at least one slotted support standard disposed with a desired mounting surface, said at least one slotted support standard being associable with said at least one mounting extension.

8. The assembly of claim 1, wherein said at least one engaging extension rotatingly and removeably associates said at least one luminaire with said at least one mounting base via a relatively horizontal flange extending from said at least one luminaire.

9. The assembly of claim 1, wherein said at least one engaging extension rotatingly and removeably associates said at least one luminaire with said at least one mounting base via a relatively horizontal cavity defined by said at least one luminaire.

10. The assembly of claim 1, wherein the luminaire leveling device is horizontally offset from said surface association means.

11. The assembly of claim 1, wherein the bracket assembly comprises at least two engaging extensions and at least two corresponding luminaire leveling devices.

12. A bracket assembly comprising:
    at least one mounting base including at least one means for associating said mounting base to modular panel furniture;
    at least one engaging extension extending from said at least one mounting base, said at least one engaging extension being configured to rotatingly associate at least one luminaire with said mounting base and suspend the at least one luminaire from the mounting base at multiple angles from a fixed position in absence of any fastener extending through a surface of said luminaire and a surface of said mounting base; and
    at least one luminaire leveling device adjustably extending from said at least one mounting base, a contact portion of said leveling device being configured to removably contact said at least one luminaire, and being configured to rotate said luminaire about said at least one engaging extension.

13. The assembly of claim 12, wherein said means for associating is at least one mounting extension, said at least one mounting extension extending from said at least one mounting base in a direction substantially opposite of said at least one engaging extension.

14. The assembly of claim 13, further including at least one slotted support standard disposed with a desired mounting surface, said at least one slotted support standard being associable with said at least one mounting extension.

* * * * *